UNITED STATES PATENT OFFICE.

JOHN M. WILSON, OF MONTCLAIR, NEW JERSEY, AND CHARLES N. FORREST, OF BROOKLYN, NEW YORK, ASSIGNORS, BY MESNE ASSIGNMENTS, TO WILSON REMOVER COMPANY, OF NEWARK, NEW JERSEY, A CORPORATION OF NEW JERSEY.

PAINT AND VARNISH REMOVER.

1,129,770.      Specification of Letters Patent.      Patented Feb. 23, 1915.

No Drawing.      Application filed July 13, 1906. Serial No. 326,118.

*To all whom it may concern:*

Be it known that we, JOHN M. WILSON and CHARLES N. FORREST, citizens of the United States, residing at Montclair, New Jersey, and Brooklyn, New York, respectively, have invented new and useful Improvements in Paint and Varnish Removers, of which the following is a specification.

Our invention relates to improvements in that class of paint and varnish removers which contain wax or analogous substances, either in solution or suspension therein and has for its objects the production of a mixture in which the wax is permanently maintained in its original condition and which is capable of producing an extremely tenacious and impervious film, upon the superficial evaporation of the solvent therefrom.

Heretofore in the production of paint and varnish removers, it has been customary, because of their excellent solvent properties, to utilize alcohols, and particularly methyl and ethyl alcohols. Owing however to the gradual and protracted action of the alcohol used, upon oxidized films of linseed oil, it is essential, in those cases where the mixture is to be exposed to atmospheric influences, that wax or other film-forming substances be incorporated in the said mixture, whereby upon the superficial evaporation of the alcohol, a thin film or envelop will be deposited, which will effectually prevent the evaporation of the remaining alcohol.

Mixtures containing wax and similar substances in suspension therein, soon deteriorate, especially in the cold, owing to the gradual deposition of the wax particles, which segregate at the bottom of the solution, with the result that the supernatant liquid is clear and practically free from wax. The finely precipitated wax, suspended in these mixtures, is also objectionable, owing to the fact that in practice it not only settles upon and coats the surfaces to be treated and tends to prevent the contact of the alcoholic solvent with the varnished surface, but also it settles in and clogs up the pores of the wood. Thus the removal of the wax becomes equally as difficult as the removal of the original varnish without the application of a paint remover.

Our experiments have led to the discovery, that if the relative quantities of the components of the mixture be suitably apportioned, a clear solution of alcohol, benzol (benzene) and wax can be obtained, at temperatures varying between 20° to 32° C. When various thickening agents are dissolved in suitable solvents and mixed with the above clear solutions, both the crystallization and deposition of the wax from the said solution can be prevented at normal temperatures.

The above mixture when applied to varnished surfaces, acts directly upon the said varnish, as opposed to the indirect action through an intermediate layer of wax, above noted, owing to the fact that the wax deposits as a film on the surface of the liquid only and occludes the alcoholic solvent of the varnish.

In carrying out our invention, we prefer to proceed as follows: One quart of alcohol, preferably ethyl or methyl, is gradually added with stirring, to a solution of two and one-half ounces of paraffin-wax in three quarts of benzol (benzene). To the above mixture is then added with constant stirring, two and one-half ounces of nitro-cellulose solution of a specific gravity of from .85 to .90 at normal temperatures. The said nitrocellulose solution contains approximately 92.5% of solvent and 7.5% of residue, the solvent preferably comprising ethyl acetate and alcohol. The solution thus obtained, possesses all of the desirable properties of wax-containing paint and varnish removers, is capable of producing a more impervious and tenacious film than those not containing gun-cotton and moreover it does not deteriorate in storage. Owing to the viscosity of our paint and varnish remover, due to the dissolved gun-cotton therein, its value for application to vertical walls or overhead surfaces is greatly enhanced since there is an entire absence of any dripping or tendency to flow downwardly as is the case when other less viscous removers are utilized in this work. The removal of the dried film from the surfaces treated, can be expeditiously accomplished, as its tenacity enables one to peel off large layers or shavings without the disintegration of the film into fine chips or a powder.

While ethyl and methyl alcohols are preferably utilized in the practice of our invention, various other solvents such for example as propyl or amyl alcohols may be substituted therefor without departing from the spirit of our invention.

Having thus described our invention, what we claim is:

1. A composition of matter comprising three quarts of benzol, one quart of alcohol, two and one-half ounces of paraffin-wax, and two and one-half ounces of nitro-cellulose dissolved in a suitable solute containing about 7% of gun-cotton, substantially as described.

2. A paint and varnish remover, comprising an alcoholic solvent of dried films of paint and varnish, nitro-cellulose in solution therein, and a normally non-volatile compound which is capable of existing as a solid at normal temperatures, and is capable of uniting with said nitro-cellulose and producing therewith a soft, yet tenacious, impervious and substantially non-adhesive superficial film upon the superficial evaporation of the alcohol, and to substantially prevent the formation of a hard, adhesive film upon the complete evaporation of the said alcohol, said composition of matter being extremely slow-drying, an active solvent of dried films of linseed oil and shellac and capable of yielding a soft, yet tenacious film having litle affinity for the surfaces to which the mixture is applied, upon the evaporation of the alcohol.

3. A paint and varnish remover, comprising an alcoholic solvent of dried films of paint and varnish, wax, a wax-solvent containing the "benzene ring" and a nitro compound of cellulose in solution in said mixture, the said composition of matter being extremely slow-drying, an active solvent of dried films of linseed oil and shellac and capable of yielding soft, yet tenacious superficial films, having little affinity for the surfaces to which the mixture is applied upon the evaporation of the alcohol.

4. A paint and varnish remover, comprising a liquid solvent of dried films of paint and varnish, including a wax solvent and a wax precipitant, a compound containing the cellulose radical, and a waxy compound capable of physical union with the said compound containing the cellulose radical, with the resultant formation upon the superficial evaporation of the volatile liquids, of a soft, yet tenacious superficial film having little affinity for the surface to which the mixture is applied.

5. The substantially fluent finish remover consisting essentially of composite volatile finish softening material including loosening finish solvent material and incorporated evaporation retarding stiffening material including sufficient soluble nitro-cellulose to have a substantial stiffening action and dissolved mineral wax.

In testimony whereof, we have signed our names to this specification in the presence of two subscribing witnesses, this (ninth) 9th day of July 1906.

JOHN M. WILSON.
CHARLES N. FORREST.

Witnesses:
J. K. WOODHALL,
WM. F. WOOD.